Nov. 17, 1959 — A. CLAUD-MANTLE — 2,913,273
BOX LID FASTENER

Filed May 14, 1957 — 4 Sheets-Sheet 1

INVENTOR
Arthur Claud-Mantle
BY Rockwell & Bartholow
ATTORNEYS

Nov. 17, 1959   A. CLAUD-MANTLE   2,913,273
BOX LID FASTENER
Filed May 14, 1957   4 Sheets-Sheet 2

INVENTOR
Arthur Claud-Mantle
BY Rockwell + Bartholow
ATTORNEYS

Nov. 17, 1959 A. CLAUD-MANTLE 2,913,273
BOX LID FASTENER
Filed May 14, 1957 4 Sheets-Sheet 3

INVENTOR
Arthur Claud-Mantle
BY Rockwell & Bartholow
ATTORNEYS

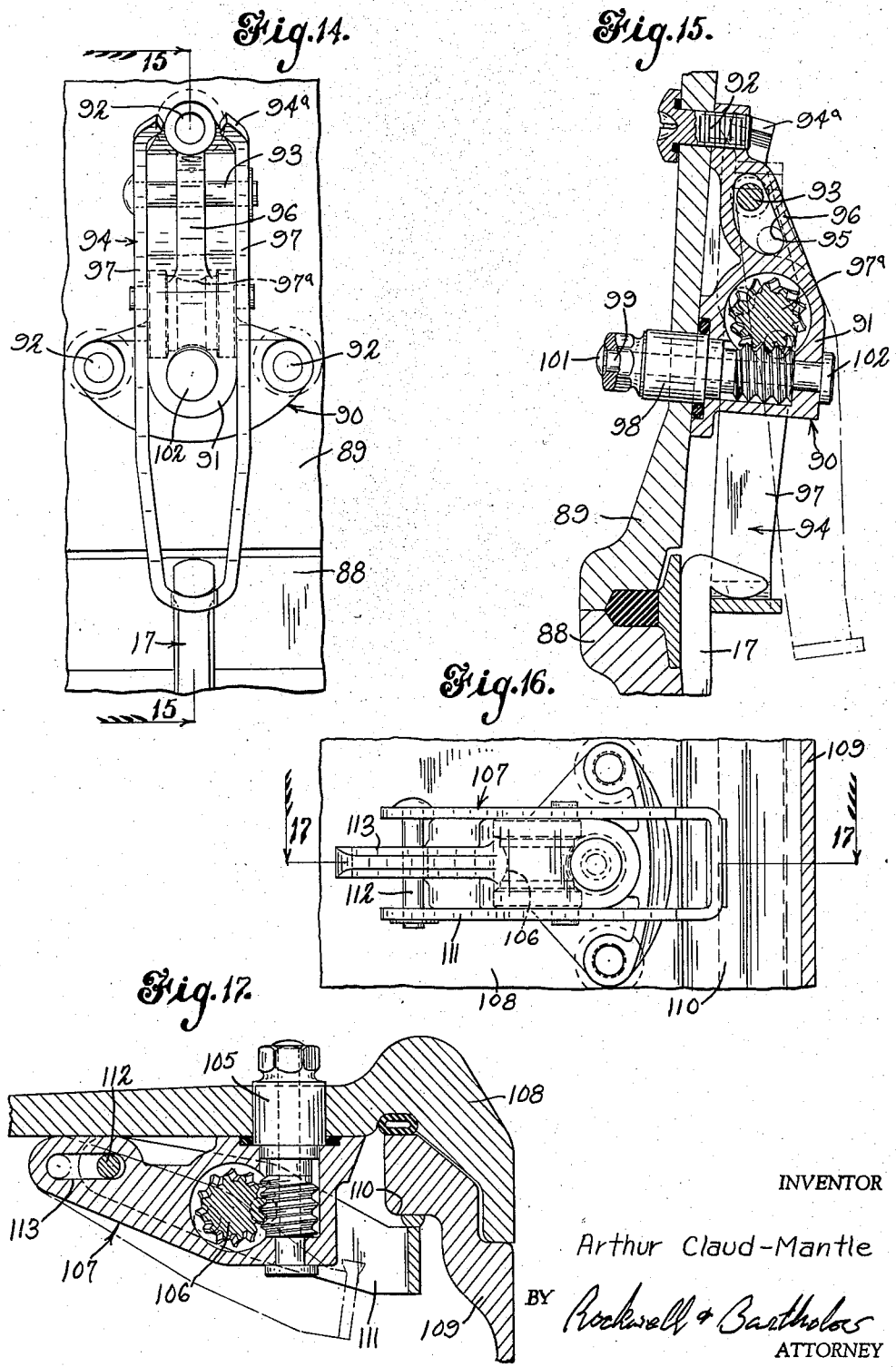

United States Patent Office 2,913,273
Patented Nov. 17, 1959

2,913,273

BOX LID FASTENER

Arthur Claud-Mantle, Trumbull, Conn., assignor to The Bassick Company, Bridgeport, Conn., a corporation of Connecticut Application May 14, 1957, Serial No. 659,110

8 Claims. (Cl. 292—246)

This invention relates to fasteners and, while not limited thereto, relates to fasteners particularly useful for securing the lids of boxes, especially boxes used for carrying and storing articles which must be protected from moisture, vapor and the like. Such containers usually include a lower body part, an upper lid part, and gasket means carried by one of the parts and adapted to provide an effective seal between the parts when compressed by the parts through the action of the fasteners.

One object of the invention is to provide an improved fastener of the gear-operated type, which is especially useful on containers such as described above, and which is admirably suited for mounting within the container structure.

Another object of the invention is to provide a fastener such as characterized above, having a latching or catch lever for cooperation with a retainer and having positive means controlling the extent of swinging movement of the lever as the latter is moved toward and away from the latched position thereof.

Still another object of the invention is to provide a fastener such as characterized above, which may be arranged either vertically or horizontally within a box structure so as to be enclosed by the latter while being operable from without the box.

A further object is to provide a fastener which is rugged and will not easily get out of order, which is dependable in service, and which is constituted by relatively few and simple parts.

Other objects of the invention will be apparent from the following detailed description of several forms of the fastener illustrated in the accompanying drawings by way of example.

In the drawings:

Fig. 14 is a view similar to Fig. 1, illustrating a further modification of the fastener;

Fig. 15 is a sectional view taken on line 15—15 of Fig. 14;

Fig. 16 is a view similar to Fig. 9, illustrating another type of box structure and still another form of the fastener; and Fig. 17 is a sectional view on line 17—17 of Fig. 16.

Figure 7:
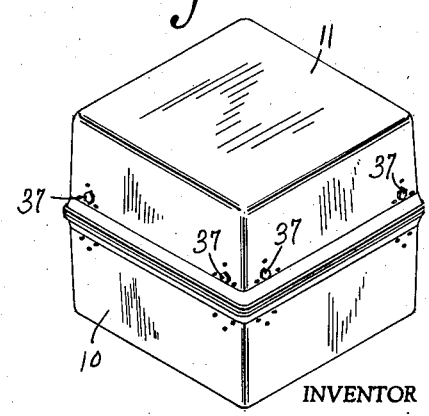
Fig. 7 is a perspective view of the box shown in Fig. 1.

For the protection of instruments, aircraft parts and other articles or apparatus requiring protection from moisture, vapor or the like, containers made of metal or other suitable material have been used, and fasteners have been employed with such containers to exert pressure on the container body and lid to compress a gasket or like sealing member therebetween. Heretofore, the fasteners for such containers have, in some instances, been open to certain objections and one aim of the invention is to provide a fastener free of these objections. A typical container or box of this kind is shown in Fig. 7 and, as illustrated in this view, the box has a lid which is relatively deep so that it is similar in form to the box body. This box, which may be of plastic or other suitable material, is shown merely by way of example and, by way of example, the box may be equipped at each of its four sides with two fasteners the parts of which are of a new construction and arrangement and embody the invention. A resilient gasket of rubber or the like is carried by one of the box elements and is adapted to be interposed between the assembled elements and compressed therebetween when and as the fasteners are operated to latch the lid element to the body element. In the first-illustrated form, the lid element is provided with a side wall structure which may be aligned and flush with the side wall structure of the body element, and the resilient gasket, which is generally of oblong form in cross section, extends into a groove formed in the upper edge of the side wall structure of the body element.

As each of the fasteners may be identical to every other fastener employed on the box shown in Fig. 7, a description of one will suffice. In each illustrated form, substantially all the mechanism of the fastener is disposed within the box so that even the fastener is in a large measure protected by the box. It will be understood that the disposition of a large part of the mechanism of the fastener within the box tends to protect the mechanism from tampering. By way of example, in the first-illustrated form the fastener is shown as having a catch assembly mounted on the lid element for cooperation with a retainer mounted on the body element of the box. The catch assembly may be mounted on the body element and the retainer may be mounted on the lid element, if desired. It will be understood that when the catch lever is mounted within the box it cannot be grasped and manipulated, and this raises certain problems concerning the control of the lever. These problems are overcome in a manner which will appear hereinafter.

In the first-illustrated form, the fastener comprises an upper bracket member fixed to the lid element of the box and having as an integral part thereof a gear housing in which is disposed an actuating or driving worm shaft meshing with a worm wheel disposed in the housing. A catch lever, for vertical swinging movement on an axis parallel to the side of the lid element to which the bracket member is attached, is pivotally connected to the worm wheel intermediate the ends of the catch lever. The catch lever, which in the instant case is constructed as a bail, is adapted to cooperate with a lower bracket member in the form of a hook carried by the body element of the box. The catch lever is moved to the latched position thereof by rotation of the worm shaft in one direction, and rotation of the worm shaft in the opposite direction effects the release of the catch lever. The worm shaft is provided with a nonround or hexagonal head extending without the box for operation by a suitable wrench. If desired, the head of the worm shaft may be provided with a nonround socket (not shown) to receive a key for turning the worm shaft.

In the drawings illustrating the first form, the body element of the box is indicated at 10, the lid element at 11, the upper bracket member generally at 12, the gear housing integral with the bracket member at 13, the worm shaft at 14, the worm wheel at 15, the catch lever at 16, and the lower bracket or retainer member generally at 17.

Figure 2:
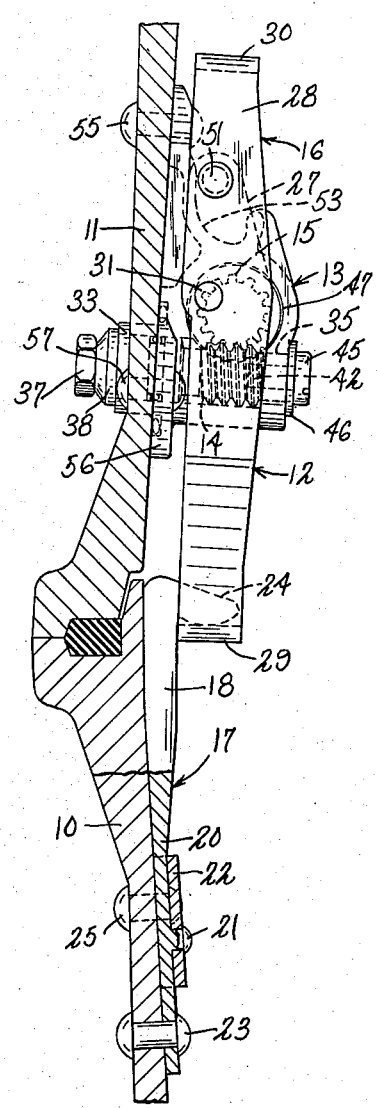
Fig. 2 is a sectional view taken on line 2—2 of Fig. 1.
Figure 3:
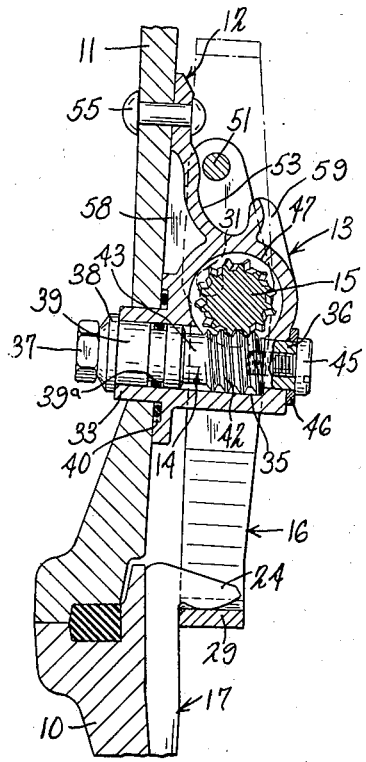
Fig. 3 is a sectional view taken on line 3—3 of Fig. 1.

The lower bracket or retainer member 17 is a composite member constituted by a vertically arranged hook element 18 and a horizontally arranged plate element 19. The hook element 18 may be formed from wire stock and has a lower flattened shank portion 20 from which a lug 21 extends. The flattened portion 20 of the shank is received in a channeled portion 22 of the plate element, and the lug 21 formed on the hook element extends through the channeled portion 22 of the plate element and, prior to assembly with the box structure, is peened to secure the hook element to the plate element. As best shown in Fig. 2, the shank portion 20 is sandwichd between the plate element 19 and the side wall structure of the box body. Below the plate element 19 the flattened portion 20 of the shank is riveted to the side wall structure of the box body, as at 23. The hook element 18 extends upwardly beyond the plate element 19 and at the upper end thereof is provided with a latching part 24 for cooperation with the catch lever 16. The part 24 of the hook element projects away from the side wall structure of the box body and is inclined downwardly, as shown in Fig. 2, for example. As shown in the last-mentioned view, the latching part 24 of the retainer member is located in close proximity to the rim of the box body. The bail-like catch lever 16 in the latched position thereof extends under the latching part 24 of the retainer member and is firmly engaged with the latter. The plate element 19 of the lower bracket or retainer member is provided with ears riveted to the side wall structure of the box body, as at 25. The arrangement is such that the hook element 18 is strongly secured to the box body in a manner to prevent either angular or lengthwise movement thereof.

Figure 1:
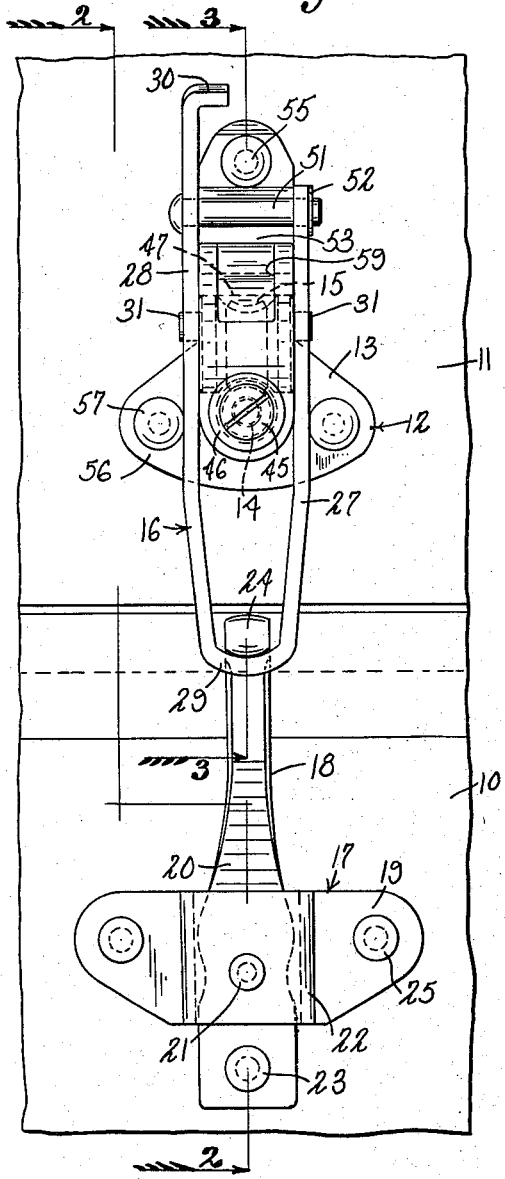
Fig. 1 is a fragmentary elevational view within a container or box, illustrating a fastener embodying the invention applied to the side wall structure of the box, and illustrating the fastener in latched condition.

The bail-like catch lever 16, which is preferably formed of sheet metal, has plate-like legs 27, 28 formed integrally with one another and interconnected by a somewhat rounded (Fig. 1) plate-like part 29, the legs closely straddling the gear housing 13 intermediate their ends. As shown in Fig. 1, the leg 28 of the lever is longer than the leg 27 and has at the distal end thereof a part 30 turned inwardly toward the axis of the leg 27. As shown in the last-mentioned view, the somewhat curved plate part 29 of the lever cooperates with the correspondingly formed under surface of the retainer part 24 to latch the lid to the box body.

The worm wheel 15 is provided with eccentric and axially aligned trunnions 31 formed integrally with the worm wheel 15 and received in the legs 27, 28 of the catch lever to pivot the lever on the worm wheel intermediate and approximately midway between the ends of the lever. Thus, the lever 16 not only has a pivotal movement on the axis of the wheel 15 but also has a pivotal movement on the axis of the eccentric trunnions 31. The trunnions 31 of the worm wheel mount the catch lever for swinging movement on a horizontal axis parallel to the side of the box lid on which the lever is supported. The faces of the worm wheel 15 are substantially flush with the respective sides of the gear housing 13 and occupy positions closely adjacent the respective legs of the catch lever 16.

Figure 6:
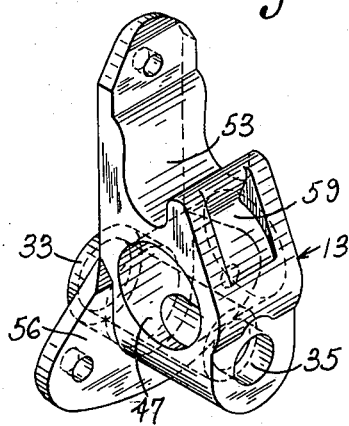
Fig. 6 is an enlarged detailed view of the gear housing of the fastener.

The upper bracket member 12, which includes the gear housing 13, is a casting having a tubular portion 33 extending through the side wall structure of the box lid somewhat beyond the exterior face thereof. The tubular portion 33 extends outwardly through the lid from the gear housing which may be of the form best shown in Fig. 6. As shown in the last-mentioned view, the tubular portion 33 projects laterally from the lower extremity of the gear housing 13 and forms an extension of a bore 35 in the housing, which is of the same diameter as the internal dimension of the tubular portion 33 except in the region of the inner end of the bore 35, the bore 35 being of reduced diameter in this region. The worm shaft 14 occupies the bore 35 and the extension 33 thereof, the shaft 14 having at its inner end a portion 36 of reduced diameter snugly received in the aforementioned reduced portion of the bore 35. The portion 36 provides an inner bearing surface of the shaft 14. At its outer end beyond the extension 33 of the bore, the shaft 14 is provided with the previously mentioned nonround or hexagonal part, indicated at 37, for cooperation with a suitable wrench. Adjoining the outer end of the extension 33 the shaft 14 is provided with an enlargement 38 of greater diameter than the internal diameter of the extension 33. Adjoining and inwardly of the enlargement 38 the shaft 14 is provided with a cylindrical portion 39 having a circumferential groove formed therein to receive an O-ring 39a for inhibiting the entrance of moisture and vapor into the box between the extension 33 and the shaft 14. It will be understood that the extension 33 is snugly received in the side wall structure of the lid to inhibit the passage of moisture and vapor between the lid and the extension 33. However, to further inhibit the passage of moisture or vapor into the box, an annular recess 40 is provided in the forward face of the gear housing 13 around the extension 33 to receive a suitable compressible sealing member which abuts the side wall structure of the lid at the interior face thereof. The shaft 14 adjoining and outwardly of the reduced inner end portion 36 thereof is provided with a worm thread 42 of approximately four turns terminating in an outer shaft portion 43 of reduced diameter adjoining the cylindrical portion 39 of the shaft which forms an outer bearing surface. The reduced inner end portion 36 of the shaft 14 at the inner extremity thereof extends beyond the inner end of the bore 35 and is tapped concentrically to receive a screw 45 which bears against a washer 46 keyed to the shaft 14 so as to rotate with the latter. The washer 46 may bear against the inner or rear face of the gear housing 13 and tends to inhibit movement of the shaft 14 in an axially outward direction.

Figure 5:
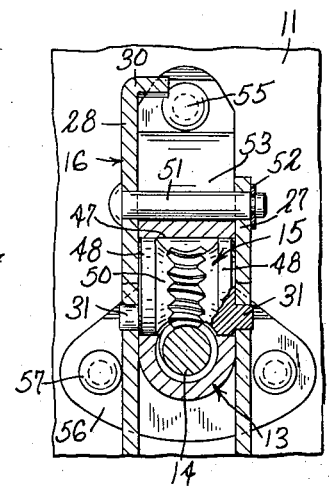
Fig. 5 is a sectional view on line 5—5 of Fig. 4.

The worm wheel 15 is disposed in a cross bore 47 intersecting the bore 35 in such a manner that the worm wheel 15 occupies a position above the shaft 14 and meshes with the latter. Adjoining each face of the worm wheel 15 (see Fig. 5) the wheel 15 is provided with a cylindrical portion 48 snugly received in the bore 47 and forming a bearing surface of the wheel 15. The trunnions on the worm wheel 15 may have their centers on a radius of the wheel 15 passing midway between two teeth of the wheel. It will be noted that the teeth of the worm wheel 15 are formed in a circumferential depression or channel 50 (Fig. 5) in the wheel. The worm shaft and the worm wheel may be plated with cadmium to insure smooth operation of the gearing.

Figure 4:
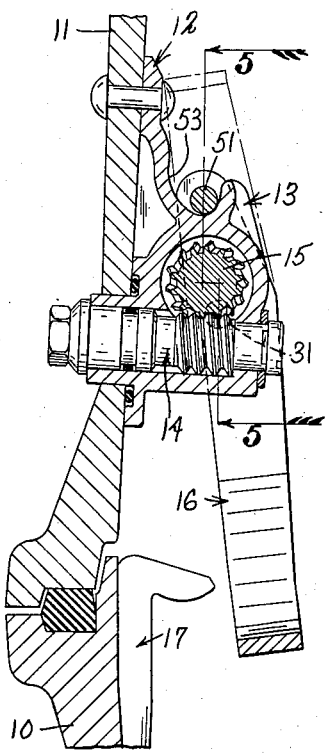
Fig. 4 is a view similar to Fig. 3 but illustrating the fastener in unlatched condition.

The catch lever 16 is provided with a cross pin 51 intermediate the ends thereof which serves as a follower for cooperation with a guide part of the bracket member 12. The cross pin 51 extends through the leg 28 of the lever in fixed relation thereto and extends through the distal end of the leg 27. The cross pin 51 is provided with an enlargement at one end to bear against the outer face of the leg 28, while at the other end thereof the pin 51 is grooved circumferentially to receive a snap ring 52 bearing against the outer face of the leg 27, the arrangement being such that axial movement of the cross pin 51 is prevented. The upper bracket member 12 at the upper part thereof above the gear housing 13 is provided with an upwardly extending fixed guide part, indicated at 53, for cooperation with the cross pin or follower 51 of the catch lever. The guide part 53 is formed by an integral portion of the bracket member which is generally of saddle or U-shape, and the follower 51 rides up and down in the last-mentioned portion. The arrangement is such that swinging movement of the lower end of the catch lever 16 toward and away from the latched position thereof on the axes of the trunnions 31 is positively controlled through the cooperation of the cross pin 51 with the guide part 53 of the bracket member. When the catch lever 16, pivoted on the trunnions 31 of the worm wheel 15, is in the unlatched position of Fig. 4, the cross pin 51 cooperates with the guide part 53 of the bracket member to inhibit dislocation of the lower or catch end of the lever 16 in a direction toward the retainer member 17. Furthermore, when the catch lever is in the released position of Fig. 4, the inwardly turned terminal part 30 of the leg 28 engages means in stationary relationship to the box lid, in this instance the upper extremity of the bracket member 12, to limit swinging movement of the lower or catch end of the lever 16 in a direction away from the retainer member 17. When the part 30 of the lever is engaged with the bracket member 12, the worm wheel 15 may not be rotated any farther in a releasing direction and, hence, the cross pin 51 cannot ride out of the guide part 53. Thus, when the catch lever 16 is in the released position thereof, the lever is very effectively secured against dislocation of the same which might interfere with either the removal or placement of the lid on the box body. As the catch lever 16 is held against dislocation while in the released position thereof, the catch lever cannot interfere with the retainer member while the lid is being removed or placed on the box body. Furthermore, it will be understood that when the catch lever is secured against dislocation in the manner indicated above, the lower or catch end of the lever cannot swing away from the retainer member 17 so as to interfere with closing of the fastener through operation of the worm wheel 15 and the actuating shaft 14. When the shaft 14 is turned to rotate the worm wheel in a direction to swing the eccentric lever-mounting trunnions 31 toward the side wall structure of the box lid and then upwardly and to some extent away from the last-mentioned structure, the pivotal axis of the lever 16 is first moved toward the side wall structure of the box lid and during this movement the cross pin 51 of the lever cooperates with the guide part 53 of the upper bracket member to control swinging movement of the lever on its pivotal axis. During this movement of the pivotal axis of the catch lever, the cross pin 51 cooperates with the cam surface 53 in a manner to inhibit swinging movement of the lower or catch end of the lever 16 in a direction away from the retainer member 17.

Above the guide part 53 of the upper bracket member and close to the upper extremity of the bracket member, a fastening member, such as a rivet 55, extends through the bracket to secure the latter to the side wall structure of the box lid. The bracket member 12 at the lower extremity thereof is provided with a web portion 56 extending below and to each side of the integrally formed gear housing 13 and the web portion is secured to the side wall structure of the box lid, as by rivets 57. To reduce the weight of the bracket member 12 the forward face of the last-mentioned member may be provided with a void 58 in a location above the actuating shaft 14. A void 59 may also be formed in the rear face of the bracket member 12 to further reduce the weight of the last-mentioned member. The plate-like legs 27, 28 of the catch lever preferably have the profile shown in Fig. 2 and, as indicated in this view, the pivotal axis of the lever 16 is located somewhat left of the longitudinal median plane of the lever. It may also be noted that when the catch lever 16 is in the latched position thereof the lever 16 is tipped (see Fig. 2) to a slight extent so that the upper end thereof leans inwardly. Furthermore, it may be noted that when the lever 16 is moved from the last-mentioned position thereof to the released position of Fig. 4, the lever swings through only a short arc of approximately 11°. To effect this movement of the lever, the actuating shaft 14 is moved through approximately five or six complete turns and the worm wheel 15 is rotated approximately 150°.

In a modified form illustrated in Figs. 8 through 13, the container is formed of metal and comprises a body element 60 provided with straight upwardly extending walls, the body element being open at the top. The container also comprises a lid element, indicated generally at 64, which, when assembled with the body element 60, is recessed in the latter. The lid element 64 comprises a central web portion 65 and the element 64 has a peripheral flange 66 formed integrally therewith and of inverted channel shape. The channel-shaped flange 66 extends entirely around the element 64 and has a compressible gasket 64ᵃ disposed therein. In this form, the retainer is formed by a flange 61 welded or otherwise suitably secured to the body element 60 and of L shape in cross section. The flange 61 is disposed within the body element 60 and extends completely around the inner face of the latter, the flange having an inwardly extending leg 62 provided at the distal end thereof with an upwardly bent portion providing a rim 63. The arrangement is such that when the lid element 64 is assembled with the body element 60 of the container the lid element extends over the rim 63 in the manner shown in Fig. 8. When the lid element 64 is in this position the gasket 64ᵃ is compressed between the rim 63 and the bottom of the channel-shaped flange 66. Catches, indicated generally at 67, are disposed at the respective corners of the lid element 64.

Figure 8:
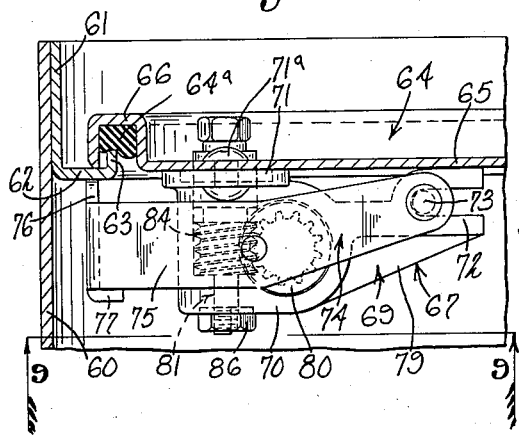
Fig. 8 is a fragmentary sectional view in elevation illustrating a fastener of modified form applied to a container of different form.
Figure 9:
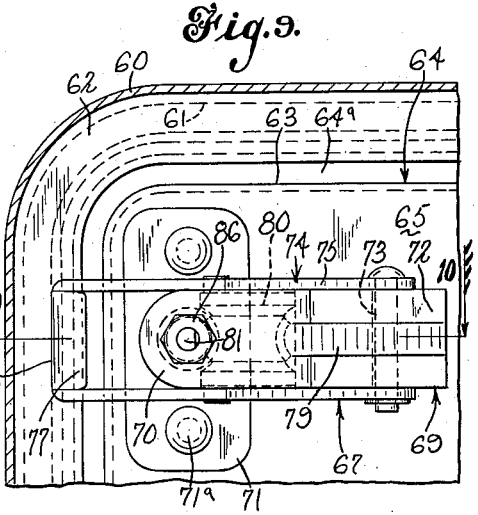
Fig. 9 is a sectional view on line 9—9 of Fig. 8.
Figure 10:
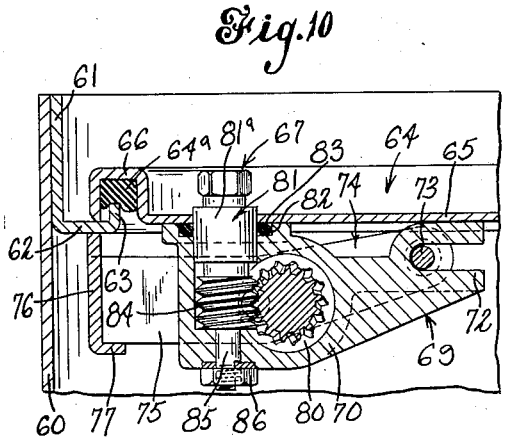
Fig. 10 is a sectional view on line 10—10 of Fig. 9.
Figure 11:
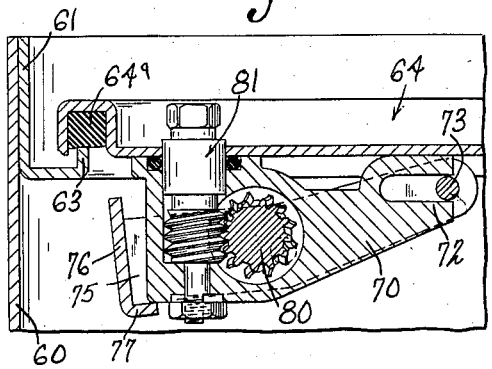
Fig. 11 is a view similar to Fig. 10 but illustrates the fastener in unlatched condition.
Figure 12:
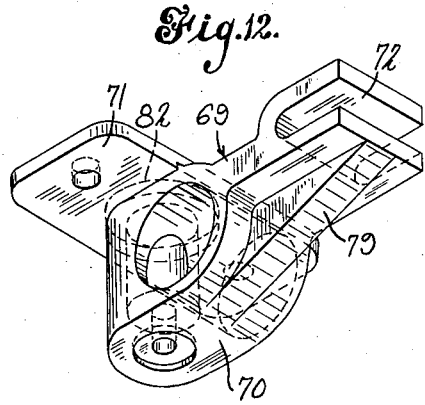
Fig. 12 is an enlarged perspective view of the gear housing employed in the last-mentioned form of the fastener.
Figure 13:
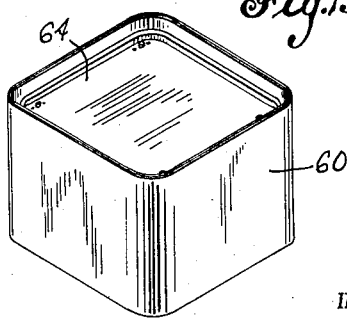
Fig. 13 is a perspective view of the container or box illustrated in Fig. 8.

Each catch 67 comprises a bracket member 69 which includes an integrally formed gear housing 70. The bracket member 69, best shown in Fig. 12, is provided with a web portion 71 to receive rivets 71ᵃ for securing the member 69 to the under side of the lid element 64. As shown in Fig. 8, for example, the bracket member 69 is horizontally arranged and is provided with a horizontally extending guide part 72 generally of saddle or U shape to receive the cross pin 73 of the catch lever 74. The catch lever 74, which is of bail-like form, is constructed of sheet metal and has plate-like legs 75 interconnected by an integral plate-like part 76. The part 76 extends above the adjoining portions of the legs 75 for cooperation with the leg 62 of the retainer flange 61. The plate-like part 76 also has a portion 77 extending horizontally below the adjoining portions of the legs 75. The portion 77 is engageable with the bracket member 69 (see Fig. 11) to limit swinging movement of the catch lever in an opening direction. This prevents the cross pin 73 from slipping out of the saddle-shaped guide part 72 of the bracket member. The legs 75 of the catch lever closely straddle the bracket member 69, as shown in Fig. 9. The bracket member 69 is provided with an integral gusset part 79 to strengthen the support of the guide part 72.

The gear housing 70 is similar to the gear housing 13 described above. A worm wheel 80, similar to the worm wheel 15 described above, is disposed in the housing 70 meshing with a worm shaft 81 similar to the worm shaft 14. In the modified form the tubular extension of the housing is omitted and the worm shaft 81 is closely received in an aperture formed in the web portion 65 of the lid element. The portion of the bracket member 69 surrounding the shaft 81 and abutting the web portion 65 is recessed, as at 82, to receive an O-ring 83 snugly embracing the worm shaft 81 to inhibit the passage of moisture or vapor into the container along the shaft 81. Approximately midway between the ends thereof, the catch lever 74 is pivoted to the gear wheel 80 by trunnions, the construction and arrangement of which is similar to the construction and arrangement of the trunnions 31, described above. The worm shaft 81 is actuated in the same manner as the worm shaft 14 and effects movement of the worm wheel 80 to move the catch lever 74 to the latched and unlatched positions thereof. As in the first form, the catch lever has only a small degree of swinging and generally lengthwise movement. Angular or swinging movement of the catch lever 74 on the trunnions of the gear wheel 80 is controlled by the cooperation of cross pin or follower 73 with guide part 72. The construction and arrangement of the cross pin 73 is similar to the construction and arrangement of the cross pin 51. The catch is latched by actuation of the shaft 81 in a direction to move the lever 74 from the position of Fig. 11 to the position of Fig. 8. In the last-mentioned position, the plate-like part 76 of the lever engages the under surface of the leg 62 of the flange 61 and in this manner holds the lid element 64 down tightly on the body element 60 of the container structure. As the catch lever 74 is swung from the latched position of Fig. 8 in a direction to release or unfasten the lid element of the container, the catch lever clears the flange 61. In the form now being described, the actuating or worm shaft extends upwardly through the lid element of the container and has at its upper extremity a head of nonround or hexagonal shape which may be turned by a suitable wrench. Adjacent and below the aforementioned head the worm shaft is provided with a cylindrical portion 81ª of somewhat greater diameter which provides an upper bearing surface for the shaft in the bracket member and also in the web portion of the lid element. The threaded portion 84 of the worm shaft is of approximately the same diameter and bottoms in a constricted part of the bore through which the worm shaft extends. Below the threaded portion 84 the worm shaft is provided with a portion 85 of reduced diameter extending beyond the lower extremity of the bracket member. The lower end of the shaft portion 85 is threaded to receive a retaining nut 86 which, with a suitable washer, prevents upward dislocation of the shaft. The upper extremity of the portion 85 provides a lower bearing surface for the shaft.

The further modification illustrated in Figs. 14 and 15 is similar to the first form in many respects. The box structure is similar to that shown in Fig. 7 and the fasteners are arranged on the box structure in the same manner. In the form now being described, the body element of the box is indicated at 88 and the lid element is indicated at 89. The lower bracket or retainer member is identical to that shown in Figs. 1 and 2 and is indicated at 17. The upper bracket member 90 is similar to the bracket member 12 and is provided with a gear housing 91 formed integrally therewith. The bracket member 90 is secured to the inner surface of the box lid by screws 92. The bracket member 90, instead of being provided at its upper part with a saddle or U-shaped guide part for the cross pin 93 of the catch lever 94, is provided with an upwardly elongated aperture 95 extending through the bracket member 90 transversely thereof, as shown in Fig. 15. The aperture 95, which has the outline shown in Fig. 15, is formed in part by a narrow upwardly extending web portion 96 (see Fig. 14) of the bracket member 90. The arrangement is such that the cross pin 93 is completely encircled by the bracket member 90.

The catch lever 94 is similar to the catch lever 16 but the legs 97 of the lever 94 are of equal length and both have at their upper ends inturned parts 94ª which, when the lever 94 is in the inoperative or broken-line position of Fig. 15, engage the upper part of the bracket member 90 to limit outward swinging movement of the lower end of the lever 94. The catch lever 94 is mounted for swinging and vertical movement in a manner similar to the mounting of the catch lever 16, the lever 94 being mounted on a worm wheel 97ª similar to the worm wheel 15. The worm wheel 97ª meshes with a worm shaft 98, the wheel 97ª and the shaft 98 being mounted in the gear housing 91 of the bracket member. The bracket member 90, in the region of the actuating or worm shaft 98, is formed in a manner similar to the bracket member 69 and the shaft 98 is similar to the shaft 81. Unlike the shaft 81, the shaft 98 is provided with a concentric bore extending therethrough and receiving a pin 99. The pin 99 is peened over at the outer end of the shaft 98, as at 101. The pin 99 at the other extermity of the shaft 98 has a flat head 102 of larger diameter than the inner end portion of the shaft 98 and overlying the inner face of the bracket member 90 in the region of the shaft 98. The shaft 98 has a nonround or hexagonal head extending outwardly beyond the lid element 89 for cooperation with a suitable wrench. When the shaft 98 is turned by a wrench, the catch lever 94 is moved to the latched and unlatched positions thereof in a manner similar to the catch lever 16. The swinging movement of the catch lever is controlled by the connection of the latter with the guide part of the bracket member.

The further modification illustrated in Figs. 16 and 17 includes an actuating or worm shaft 105, very similar to the worm shaft 98, and a worm wheel 106 meshing with the shaft 105, very similar to the worm wheel 97ª. The bracket member 107 is very similar to the bracket member 90 but, instead of being arranged vertically, is arranged horizontally. In the form now being described, the container structure is somewhat different from that shown in Fig. 13. The lid element 108 of the container is not recessed within the body element 109 but instead extends over the side wall structure of the body element 109 in the manner shown in Fig. 17. The rim portion of the body element 109 is stepped, as shown in the last-mentioned view, to provide a downwardly facing shoulder, as at 110, for cooperation with the catch lever 111. The catch lever 111 is much like the catch lever 75, described above, but at the catch end thereof has no part engageable with the bracket member 107. This is not needed as the cross pin 112 of the lever 111 is completely encircled by the guide part 113 of the bracket 107 so that it cannot escape from the bracket member and the angular position of the trunnions of the wheel 106 is such that the initial movement of the trunnions in releasing the catch lever is in a direction away from the outer end of the operating shaft 105. In the form now being described, the guide part 113 of the bracket member provides an elongate straight slot in which the cross pin or follower 112 rides. It will be understood that the form of the cam surface provided by the guide part of the bracket member is dictated in each case by the angular positions and movement of the trunnions when the fastener is released or engaged. In the broken-line position of the catch lever 111 in Fig. 17, the cooperation of the follower 112 with the guide part 113 is such that releasing movement of the lever 111 is limited, and the cooperation of the follower 112 and the guide part 113 is also such that movement of the lever from the last-mentioned or released position to the full-line or latched position of Fig. 17 is positively controlled. Where (as in the form shown in Figs. 14 and 15, for example) the angular position of the trunnions is such that the initial movement of the trunnions in releasing the catch lever is in a direction toward the outer end of the operating shaft, the guide part of the bracket member must be shaped in a manner to permit some in and out movement, that is, movement in a direction parallel to the operating shaft. This necessitates the employment of a part of the lever, in this instance a terminal part, to engage the bracket member and thereby limit the releasing movement of the lever and continued rotation of the worm shaft and wheel.

In accordance with the foregoing disclosure there is provided an improved fastener of the gear-operated type, which is especially useful on containers for delicate instruments which must be protected from moisture and vapor, the fastener being admirably suited for mounting within the container structure. There is also provided a fastener having a catch lever for cooperation with a retainer or the like, and having positive means controlling swinging movement of the lever as the latter is moved toward and away from the latched positions thereof. Another advantage is that the fastener may be mounted within a box or container either vertically or horizontally. The fastener is constituted by relatively few and simple parts and will not easily get out of order. It is rugged and dependable in service.

While several forms of the fastener have been illustrated and described above, it will be apparent that the fastener is susceptible of various modifications and changes in details without departure from the principles of the invention and the scope of the appended claims.

What I claim is:

1. In a fastener for internal application to a box structure and having a retainer member, a bifurcated catch lever for mounting within the box structure and for cooperation with the retainer member, means forming a gear housing for mounting within the box structure, gear means extending into the housing and operable from without the box structure, the gear means comprising an operating gear shaft meshing with a worm wheel, the lever straddling the wheel and being mounted on the latter intermediate the ends of the lever for pivotal movement on an axis eccentric to the wheel, at least one leg of the bifurcated lever having at its distal end removed from the retainer member a part engageable with a fixed part integral with the gear housing to limit releasing movement of the lever, the lever having as a part thereof a cross pin received in the arms of the lever and serving as a follower, and means integral with the gear housing and forming a guide for cooperation with the follower to positively control swinging movement of the lever within the box structure, the last-mentioned means at least partially confining the cross pin and defining a path for the latter extending generally lengthwise of the lever.

2. In a fastener for internal application to a box structure and having a retainer member, a bifurcated catch lever for mounting within the box structure and for cooperation with the retainer member, means forming a gear housing for mounting within the box structure, gear means extending into the housing and operable from without the box structure, the gear means comprising an operating gear shaft meshing with a worm wheel, the lever straddling the wheel and being mounted on the latter intermediate the ends of the lever for pivotal movement on an axis eccentric to the wheel, one leg of the bifurcated lever being longer than the other and having at its distal end removed from the retainer member a part engageable with a fixed part integral with the gear housing to limit releasing movement of the lever, and the lever having as a part thereof a cross pin received in the arms of the lever and serving as a follower, and means integral with the gear housing and forming a guide for cooperation with the follower to positively control swinging movement of the lever within the box structure, the last-mentioned means comprising a saddle-shaped part partially confining the cross pin.

3. In a fastener for internal application to a box structure and having a retainer member, a bifurcated catch lever for mounting within the box structure and for cooperation with the retainer member, means forming a gear housing for mounting within the box structure, gear means extending into the housing and operable from without the box structure, the gear means comprising an operating gear shaft meshing with a worm wheel, the lever straddling the wheel and being mounted on the latter intermediate the ends of the lever for pivotal movement on an axis eccentric to the wheel, the legs of the bifurcated lever being of substantially equal length and having at their distal ends removed from the retainer member parts engageable with a fixed part integral with the gear housing to limit releasing movement of the lever, and the lever having as a part thereof a cross pin received in the arms of the lever and serving as a follower, and means integral with the gear housing and forming a guide for cooperation with the follower to positively control swinging movement of the lever within the box structure, the last-mentioned means defining an aperture in a part formed as an integral member of the gear housing, and the cross pin or follower being received in said aperture.

4. In a device of the character described, a box body having a laterally inwardly extending rim portion for serving as a retainer member for a catch lever, a box lid extending over and cooperating with the rim portion, a bifurcated catch lever below the under side of the lid and horizontally arranged to swing under and against said rim portion to hold down the lid on the body, means forming a gear housing at the under side of the top of the lid and in fixed relation thereto, gear means extending into the housing and operable from above the lid, the gear means comprising an operating worm shaft meshing with a worm wheel, the shaft being vertically arranged and extending into the top of the lid, the lever straddling the wheel and being mounted on the latter intermediate the ends of the lever for pivotal movement on an axis eccentric to the wheel, and means integral with the gear housing and forming a guide for movement of the lever, the lever having as a part thereof a cross pin serving as a follower for cooperation with the guide, and the guide comprising a part at least partially confining the cross pin and defining a path for the latter extending generally lengthwise of the lever.

5. In a device of the character described, a box body having a laterally inwardly extending rim portion for serving as a retainer member for a catch lever, a box lid extending over and cooperating with the rim portion, a bifurcated catch lever below the under side of the lid and horizontally arranged to swing under and against said rim portion to hold down the lid on the body, means forming a gear housing at the under side of the top of the lid and in fixed relation thereto, gear means extending into the housing and operable from above the lid, the gear means comprising an operating worm shaft meshing with a worm wheel, the shaft being vertically arranged and extending into the top of the lid, the lever straddling the wheel and being mounted on the latter intermediate the ends of the lever for pivotal movement on an axis eccentric to the wheel, and means integral with the gear housing and forming a guide for movement of the lever, the last-mentioned means defining an aperture in a part formed as an integral member of the gear housing, and the lever having as a part thereof a cross pin serving as a follower and extending into said aperture for cooperation with the guide.

6. In a device of the character described, a box body having a laterally inwardly extending rim portion for serving as a retainer member for a catch lever, a box lid extending over and cooperating with the rim portion, a bifurcated catch lever below the under side of the lid and horizontally arranged to swing under and against said rim portion to hold down the lid on the body, means forming a gear housing at the under side of the top of the lid and in fixed relation thereto, gear means extending into the housing and operable from above the lid, the gear means comprising an operating worm shaft meshing with a worm wheel, the shaft being vertically arranged and extending into the top of the lid, the lever straddling the wheel and being mounted on the latter intermediate the ends of the lever for pivotal movement on an axis eccentric to the wheel, and means integral with the gear housing and forming a guide for movement of the lever, the last-mentioned means comprising a saddle-shaped part, the lever having as a part thereof a cross pin serving as a follower for cooperation with the guide and extending into the saddle-shaped part to be partially confined by the latter.

7. In a fastener for internal application to a box structure and having a retainer member, a catch lever for mounting within the box structure and for co-operation with the retainer member, means forming a gear housing for mounting within the box structure, gear means extending into the housing and operable from without the box structure, the gear means pivotally mounting the catch lever for swinging movement toward and away from the retainer member, and means integral with the gear housing and forming a guide for the movement of the catch lever, the lever having as a part thereof a cross-pin follower for co-operation with the guide to positively control swinging movement of the lever within the box structure, the guide being formed so as to at least partially confine the cross-pin follower and define a path for the latter extending generally lengthwise of the catch lever.

8. A fastener as defined in claim 7, wherein the catch lever is of bifurcated form and at one end is provided with a part engageable with a fixed part integral with the gear housing to thereby limit releasing movement of the lever.

References Cited in the file of this patent

UNITED STATES PATENTS

| | | |
|---|---|---|
| 1,060,189 | Jones | Apr. 29, 1913 |
| 1,083,438 | Dohse | Jan. 6, 1914 |
| 1,287,000 | Greaves | Dec. 10, 1918 |
| 2,036,151 | Lang | Mar. 31, 1936 |